United States Patent [19]

Kuwana et al.

[11] Patent Number: 5,150,952
[45] Date of Patent: Sep. 29, 1992

[54] ANTI-SKID CONTROL SYSTEM FOR AN AUTOMOTIVE VEHICLE

[75] Inventors: Kazutaka Kuwana, Toyota; Tsuyoshi Yoshida, Obu; Hiroyuki Ichikawa, Okazaki; Kenji Tozu, Kariya, all of Japan

[73] Assignee: Aisin Seiki Kabushiki Kaisha, Kariya, Japan

[21] Appl. No.: 613,068

[22] Filed: Nov. 15, 1990

[30] Foreign Application Priority Data

Nov. 16, 1989 [JP] Japan ................. 1-298489

[51] Int. Cl.⁵ ................................. B60T 8/52
[52] U.S. Cl. ................................. 303/109; 303/110; 364/426.02
[58] Field of Search ............... 303/107, 108, 109, 110, 303/103, 113 R; 364/426.2

[56] References Cited

U.S. PATENT DOCUMENTS

| | | | |
|---|---|---|---|
| 3,776,357 | 12/1973 | Arai et al. | 303/109 |
| 4,629,259 | 12/1986 | Bräuninger | 303/109 |
| 4,717,209 | 1/1988 | Hagiya et al. | 303/110 X |
| 4,748,564 | 5/1988 | Matsuda | 303/110 |
| 4,762,375 | 8/1988 | Maki et al. | 303/109 X |
| 4,763,260 | 8/1988 | Sakuma et al. | 364/426 |
| 4,790,607 | 12/1988 | Atkins | 303/110 |
| 4,919,494 | 4/1990 | Hagashimata et al. | 303/110 |

FOREIGN PATENT DOCUMENTS

3435864  4/1986  Fed. Rep. of Germany.
61-36052  2/1986  Japan.

Primary Examiner—Matthew C. Graham
Attorney, Agent, or Firm—Burns, Doane, Swecker & Mathis

[57] ABSTRACT

The invention is directed to an anti-skid control system for controlling a braking force applied to each of the road wheels with a hydraulic braking pressure supplied to a wheel brake cylinder through pressure control means. A wheel speed of each of the road wheels is detected. Then, an estimated vehicle speed for each of the road wheels is calculated on the basis of the wheel speed and a decreasing rate of estimated vehicle speed for at least one of the road wheels other than the road wheel for which the estimated vehicle speed is being calculated. The estimated vehicle speed is, therefore, prevented from being set largely below the actual speed of the vehicle. The pressure control means is provided for increasing, holding or decreasing the hydraulic braking pressure in response to a result of comparison between the estimated vehicle speed and the wheel speed for each of the road wheels.

6 Claims, 8 Drawing Sheets

ANTI-SKID CONTROL SYSTEM FOR AN AUTOMOTIVE VEHICLE

BACKGROUND OF THE INVENTION

1. Field of the Invention

The present invention relates to an anti-skid control system for use in an automotive vehicle, and more particularly to an anti-skid control system for controlling braking force applied to road wheels in braking operation to prevent the road wheels from being locked.

2. Description of the Prior Art

It is known that the vehicle stability or the controllability is influenced detrimentally depending upon the road surface condition, when road wheels are locked in abrupt braking operation. In order to prevent the road wheels from being locked, therefore, there has been employed an anti-skid control system which controls the braking force by decreasing or increasing a hydraulic braking pressure supplied to a wheel brake cylinder. In view of the fact that when the hydraulic braking pressure supplied to the wheel brake cylinder is increased, the rotational speed of the road wheel is rapidly reduced immediately before a coefficient of friction of a road surface relative to the road wheel reaches a maximum, the anti-skid control system controls the hydraulic braking pressure according to the wheel speed and wheel acceleration in order that a slip rate of the road wheel results in around 10% to 20%, that is, the maximum coefficient of friction is obtained. Especially, according to the whole wheel control system which controls the hydraulic pressure in the wheel brake cylinder mounted on each of all the road wheels, not only stability but also controllability will be obtained.

The whole wheel control system is arranged, for example, to detect a rotational speed of each of the road wheels or a wheel speed, calculate an estimated vehicle speed on the basis of the wheel speeds of all the road wheels, and calculate therefrom a threshold value which is compared with the wheel speed of each road wheel, and then control the hydraulic braking pressure in the wheel brake cylinder mounted on each road wheel in response to the result of comparison. According to this system, supposing that the anti-skid control is initiated while the vehicle is turning to the left, in the case where the estimated vehicle speed is calculated on the basis of the wheel speed of the front road wheel at the right side which speed will be maximum in this case, and the braking force applied to the rear road wheel at the left side for example is controlled in accordance with the threshold level calculated from the estimated vehicle speed, then the anti-skid control will be performed in accordance with the estimated vehicle speed calculated on the basis of the maximum wheel speed of the front road wheel at the right side, notwithstanding that the wheel speed of the rear road wheel at the left side is low. Consequently, the hydraulic pressure in the wheel brake cylinder mounted on the rear road wheel at the left side will be excessively decreased. If the threshold value is set to a lower speed to prevent it, the decreasing rate of the wheel speed of each road wheel in normal braking operation of the vehicle traveling in the straight forward direction will become large, so that the vehicle stability might be influenced detrimentally.

In Japanese Patent Laid-open Publication No. 61-36052, it has been described as a prior art that a higher wheel speed is selected from a wheel speed of a road wheel to be steered and a wheel speed of a road wheel not to be steered, and the estimated vehicle speed is calculated on the basis of the selected wheel speed. It has been pointed out in the above Publication that the prior art has a following defect. That is, when the vehicle is turning at low speed, the wheel speed of the road wheel located on the inside of a curve out of the right and left road wheels to be steered will be low, comparing with the road wheel located on the outside of the curve, or the average of wheel speeds of two rear road wheels not to be steered will be low, so that the slip rate will be too large to decrease the hydraulic braking pressure. It has been proposed, therefore, to provide select-low means for selecting a wheel speed of one of the road wheels to be steered lower than that of the other, and select-high means for selecting a higher wheel speed between an output of the select-low means and the wheel speed of the road wheels not to be steered to provide an estimated vehicle speed for the road wheels not to be steered.

According to the system described in the Publication No. 61-36052, it has been proposed to prevent the hydraulic braking pressure from being excessively decreased due to the wheel speed difference between the road wheels located on the inside and the outside of a curve in the vehicle's path, by providing the estimated vehicle speed as described above. In the proposed system, however, when the road wheels to be steered are under anti-skid control for example, the wheel speeds of road wheels other than the road wheel to be controlled are not taken into consideration, so that quick lock of the road wheels might be caused with the estimated vehicle speed provided much lower than the actual vehicle speed. Especially, in the case where the road wheels to be steered are driven, the quick lock is likely to be caused when a low-speed gear is selected.

SUMMARY OF THE INVENTION

Accordingly, it is an object of the present invention to provide an anti-skid control system for an automotive vehicle which calculates an estimated vehicle speed for each of the road wheels to prevent an excessive decrease of a hydraulic braking pressure in a wheel brake cylinder from being caused by the wheel speed difference between the road wheels of tires having different sizes or between the road wheels located on the inside and the outside of a curve in the vehicle's path, and prevent quick lock of the road wheels from occurring.

In accomplishing the above and other objects, an anti-skid control system for an automotive vehicle which has a wheel brake cylinder mounted on each of road wheels for applying a braking force thereto and a master cylinder for supplying a hydraulic braking pressure to the wheel brake cylinder. The system includes means for detecting a wheel speed of each of the road wheels and providing output signal corresponding to the wheel speed, and means for receiving the output signal and providing an estimated vehicle speed for each of the road wheels. This estimated vehicle speed is calculated on the basis of the wheel speed of each of the road wheels and a decreasing rate of estimated vehicle speed for at least one of the road wheels other than the road wheel for which the estimated vehicle speed is calculated. Comparing means is provided for comparing the estimated vehicle speed and the wheel speed for each of the road wheels, and pressure control means is provided for increasing, holding or decreasing the hydraulic braking pressure in response to a result of comparison between the estimated vehicle speed and the wheel speed for each of the road wheels.

In the above-described anti-skid control system, the means for providing the estimated vehicle speed is preferably arranged to calculate the estimated vehicle speed for each of the road wheels on the basis of the wheel speed of each of the road wheels and the minimum decreasing rate of estimated vehicle speed in the decreasing rates of estimated vehicle speed for the road wheels other than the road wheel for which the estimated vehicle speed is calculated.

Further, in the above-described anti-skid control system, the means for providing the estimated vehicle speed may be arranged to limit a decreasing rate of the estimated vehicle speed of each of the road wheels in response to the decreasing rate of estimated vehicle speed for at least one of the road wheels other than the road wheel for which the estimated vehicle speed is calculated.

BRIEF DESCRIPTION OF THE DRAWINGS

The above stated object and following description will become readily apparent with reference to the accompanying drawings, wherein like reference numerals denote like elements, and in which.

DESCRIPTION OF THE PREFERRED EMBODIMENTS

Figure 1:
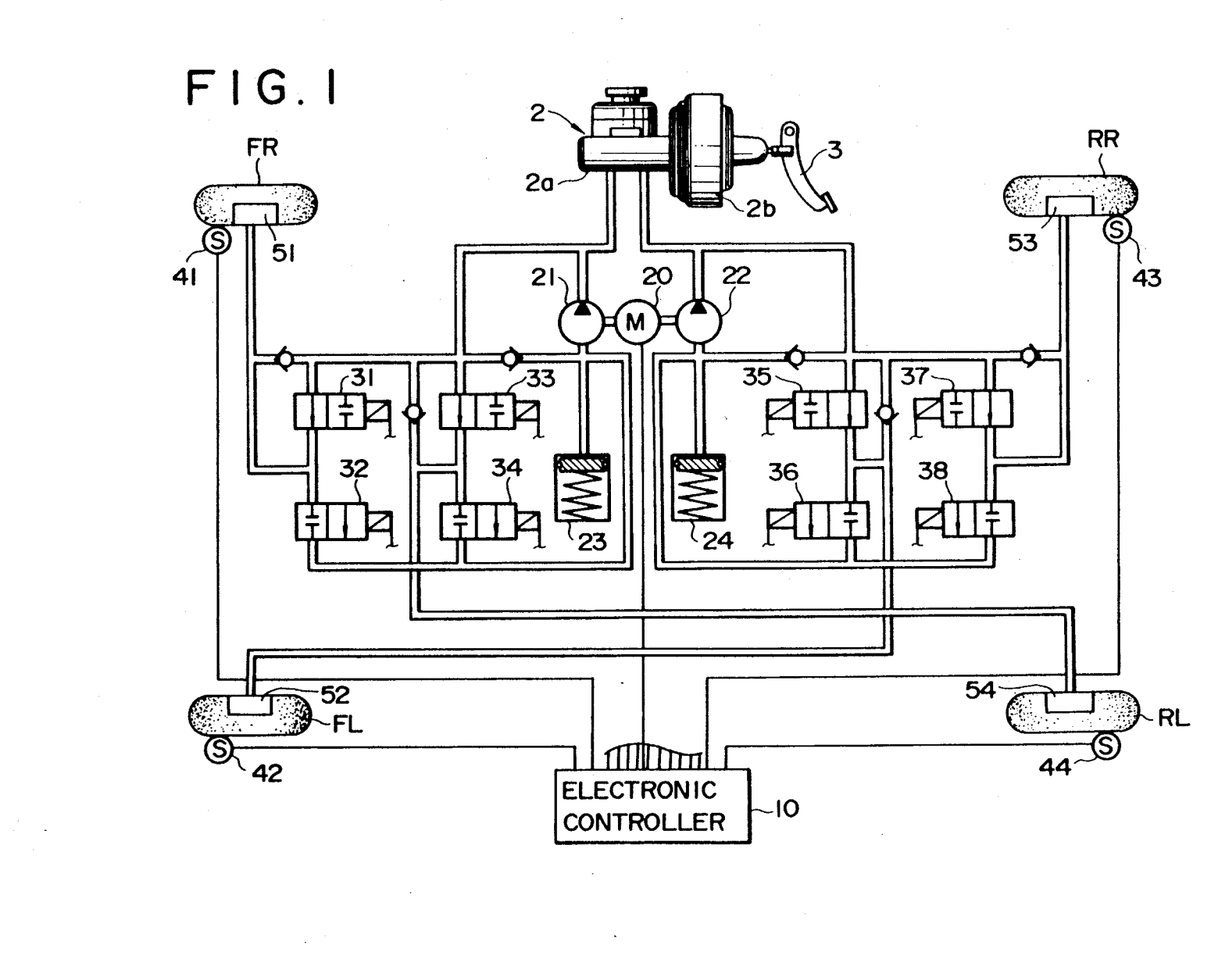
FIG. 1 is a schematic block diagram of an anti-skid control system of an embodiment according to the present invention.

Referring to FIG. 1, there is schematically illustrated an embodiment of the present invention, wherein pumps 21, 22, reservoirs 23, 24 and solenoid valves 31 to 38 are disposed in hydraulic circuits for connecting a hydraulic pressure generator 2 which includes a master cylinder 2a and a booster 2b operated in response to depression of a brake pedal 3, to wheel brake cylinders 51 to 54 of road wheels FR, FL, RR, and RL. The road wheel FR designates a road wheel at the fore right side as viewed from the position of a driver's seat, the road wheel FL designates a road wheel at the fore left side, the road wheel RR designates a road wheel at the rear right side, and the road wheel RL designates a road wheel at the rear left side, and a so-called diagonal circuit is employed as is apparent from FIG. 1

The solenoid valves 31, 32 and solenoid valves 33, 34 are disposed respectively in hydraulic circuits for connecting one output port of the master cylinder 2a to the wheel brake cylinders 51, 54, and the pump 21 is disposed between the master cylinder 2a and the solenoid valves 31 to 34. Similarly, the solenoid valves 35, 36 and solenoid valves 37, 38 are disposed respectively in hydraulic circuits for connecting the other output port of the master cylinder 2a to the wheel brake cylinders 52, 53, and the pump 22 is disposed between the master cylinder 2a and the solenoid valves 35 to 38. The pumps 21, 22 are driven by an electric motor 20, so that brake fluid raised to a predetermined pressure is supplied to these hydraulic circuits. Accordingly, these hydraulic circuits serve as the circuits through which the hydraulic braking pressure is supplied to the normally open solenoid valves 31, 33, 35, 37. The hydraulic circuits at the drain side of the normally closed solenoid valves 32, 34 are connected to the pump 21 through the reservoir 23, and the hydraulic circuits at the drain side of the solenoid valves 36, 38 are connected to the pump 22 through the reservoir 24. Each of the reservoirs 23, 24 is provided with a piston and a spring, and functions so as to store the brake fluid returned from each of the solenoid valves 32, 34, 36, 38 through the hydraulic circuits at the drain side thereof, and to supply the brake fluid to each of those solenoid valves when the pumps 21, 22 operate.

Each of the solenoid valves 31 to 38 is a two ports-two positions solenoid operated changeover valve, and is in its first operating position as shown in FIG. 1 when a current is not fed to its solenoid coil, so that each of the wheel brake cylinders 51 to 54 is communicated with the hydraulic pressure generator 2 and the pump 21 or 22. When the current is fed to the solenoid coil, each solenoid valve is changed over to its second operating position, so that each of the wheel brake cylinders 51 to 54 is shut off from the communication with the hydraulic pressure generator 2 and the pump 21 or 22, and is communicated with the reservoir 23 or 24. Check valves shown in FIG. 1 permit the brake fluid to return from each of the wheel brake cylinders 51 to 54 and the reservoirs 23, 24 to the hydraulic pressure generator 2, and blocks the counterflow of the brake fluid.

Accordingly, with each of the solenoid valves 31 to 38 turned on or off, the hydraulic braking pressure in each of the wheel brake cylinders 51 to 54 (hereinafter referred to as wheel cylinder pressure) is decreased or increased. Namely, when the current is not fed to the solenoid coil of each of the solenoid valves 31 to 38, the hydraulic braking pressure is supplied from the hydraulic pressure generator 2 and the pump 21 or 22 to each of the wheel brake cylinders 51 to 54 to increase the hydraulic braking pressure in each wheel brake cylinder On the other hand, when the current is fed to the solenoid coil, each of the wheel brake cylinders 51 to 54 is communicated with the reservoir 23 or 24 to decrease the hydraulic braking pressure in each wheel brake cylinder. As the solenoid valves 31 to 38, there may be employed three ports-two positions solenoid operated valves of a half number of the valves 31 to 38.

The above-described solenoid valves 31 to 38 are connected to the electronic controller 10 which controls the operation of the solenoid valves 31 to 38. The electric motor 20 is also connected to the electronic controller 10, so that the operation of the electric motor 20 is controlled by the electronic controller 10. At the road wheels FR, FL, RR and RL, there are provided wheel speed sensors 41 to 44 respectively, which are connected to the electronic controller 10, and by which a signal corresponding to a rotational speed of each road wheel, i.e., a wheel speed signal is fed to the electronic controller 10. Each of the wheel speed sensors 41 to 44 in the present embodiment is a well known sensor of electromagnetic induction type which comprises a pick-up having a coil wound around a permanent magnet and a rotor having an outer peripheral end thereof provided with teeth, and functions to output a voltage with a frequency proportional to the rotational speed of each road wheel. Further, a Hall IC or a photosensor or the like may be used for the wheel speed sensors 41 to 44, instead of the above-described sensor.

Figure 2:
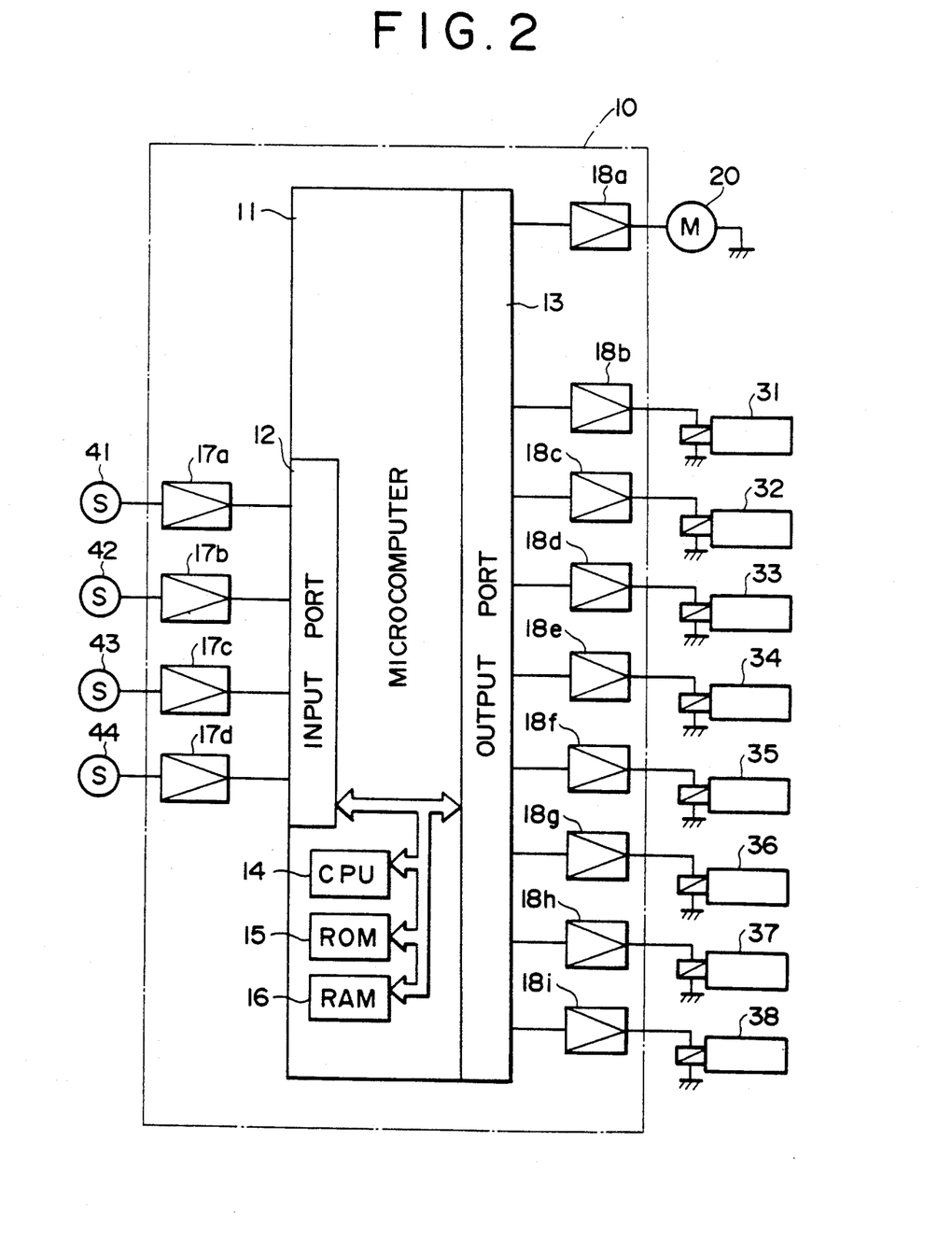
FIG. 2 is a block diagram illustrating the arrangement of an electronic controller as shown in FIG. 1.

As shown in FIG. 2, the electronic controller 10 is provided with a one-chip microcomputer 11, which includes a central processing unit or CPU 14, a read-only memory or ROM 15 and a random access memory or RAM 16, which are connected with an input port 12 and an output port 13 via a common bus to execute the input/output operations relative to external circuits. The signal detected by each of the wheel speed sensors 41 to 44 is fed to the input port 12 via respective amplification circuits 17a to 17d and then to the CPU 14. Then, a control signal is output from the output port 13 to the electric motor 20 via a drive circuit 18a, and control signals are output to the solenoid valves 31 to 38 via the respective drive circuits 18b to 18i.

A program routine executed by the electronic controller 10 for the anti-skid control will now be described with reference to FIGS. 3-7, which are flowcharts showing an operation executed in accordance with a program of one embodiment of the present invention, which program is executed repeatedly at intervals of a predetermined period of time.

Figure 3:
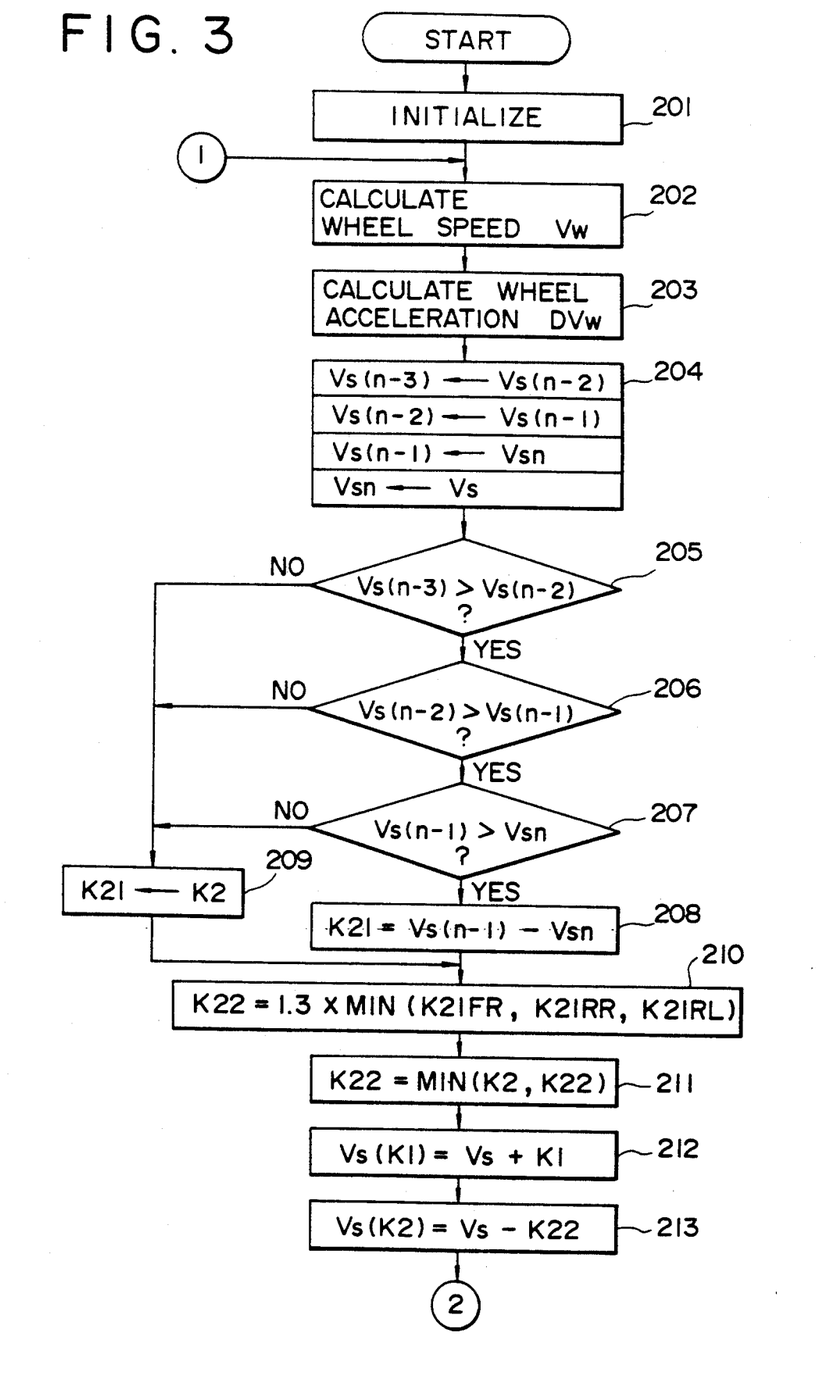
FIGS. 3, 4, 5, 6 and 7 are flowcharts showing the operation of the braking force control according to an embodiment of the present invention.
Figure 4:
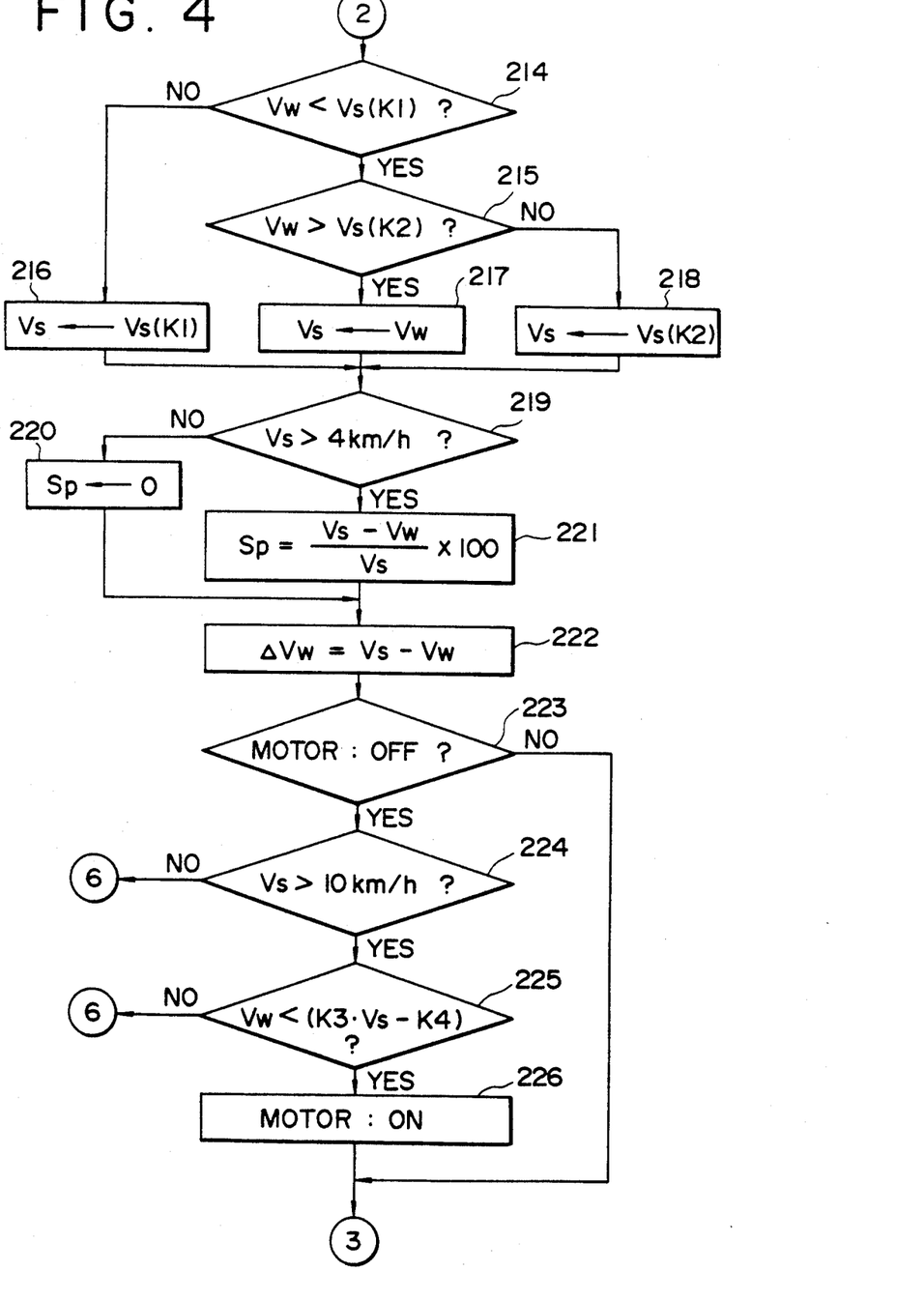

The program routine provides for initialization of the system at Step 201 where various counters, timers or the like are cleared. As for internal registers of the microcomputer 11, there are provided mode registers and flag registers. The mode registers are arranged to provide various modes such as a decrease mode, an increase mode and a hold mode which decreases, increases and holds the wheel cylinder pressure respectively. In addition, the mode registers provide a pulse increase mode, a pulse decrease mode and a rapid decrease mode. The pulse decrease mode performs a "decrease pressure" operation for decreasing the wheel cylinder pressure during a first predetermined period of time properly set as described later, and performs a "hold pressure" operation for holding the wheel cylinder pressure as it is during a second predetermined period of time following the decrease pressure operation to repeatedly perform the "decrease pressure" and "hold pressure", i.e., to perform a "pulse decrease pressure". The pulse increase mode is a mode to repeatedly perform a "increase pressure" operation for increasing the wheel cylinder pressure and the "hold pressure" operation, i.e., to perform a "pulse increase pressure". The rapid decrease mode is a mode to perform only the "decrease pressure" operation, but decrease the wheel cylinder pressure rapidly comparing with the operation in the pulse decrease mode. As to the flags, there are provided at least a rapid decrease flag which is set (to "1") to provide the rapid decrease mode, and a pulse increase flag which is set to provide the pulse increase mode.

As to the counters, there is provided at least a pulse increase counter which counts the number of the "pulse increase pressure" performed. As for the timers, there are provided a system timer, as well as a decrease timer, an increase timer and a hold timer which output a decrease mode signal, an increase mode signal and a hold mode signal for a predetermined period of a decreasing time, an increasing time and a holding time respectively.

Then, the program proceeds to Step 202 in FIG. 3, where the wheel speed of each of the road wheels is calculated in known fashion on the basis of the output signal from each of the wheel speed sensors 41 to 44. Hereinafter will be used a vehicle speed Vw and an estimated vehicle speed Vs of the road wheel FL representing others for simplicity. The rest of the road wheels will be controlled in the same manner as the road wheel FL explained. Next, the wheel acceleration DVw is calculated from the wheel speed Vw at Step 203. The wheel acceleration DVw includes the wheel deceleration which is indicated by a negative value, while the acceleration is indicated by a positive value. Then, the program proceeds to Step 204 where the estimated vehicle speed $Vs(n-2)$ calculated in the cycle preceding by four cycles is set as the estimated vehicle speed $Vs(n-3)$ to provide the value for that cycle. At the same time, the estimated vehicle speed $Vs(n-1)$ calculated in the cycle preceding by three cycles, the speed Vsn calculated in the cycle preceding by two cycles and the speed Vs calculated in the immediate preceding cycle are set as the estimated vehicle speed $Vs(n-2)$, $Vs(n-1)$ and Vsn respectively to provide the values for those cycles. Following Step 204, it is determined at Step 205 whether or not the estimated vehicle speed $Vs(n-3)$ in the cycle preceding by four cycles is greater than the estimated vehicle speed $Vs(n-2)$ in the cycle preceding by three cycles. If the speed $Vs(n-3)$ is greater than the speed $Vs(n-2)$, the program proceeds to Step 206, otherwise it proceeds to Step 209. At Step 206, it is determined if the estimated vehicle speed $Vs(n-2)$ in the cycle preceding by three cycles is greater than the estimated vehicle speed $Vs(n-1)$ in the cycle preceding by two cycles. If yes, the program proceeds to Step 207, otherwise it proceeds to Step 209. At Step 207, then, it is determined if the estimated vehicle speed $Vs(n-1)$ in the cycle preceding by two cycles is greater than the estimated vehicle speed Vsn in the immediate preceding cycle. If not, the program proceeds to Step 209. If the speed $Vs(n-1)$ is greater than the speed Vsn, the program proceeds to Step 208 where the difference between the estimated vehicle speeds $Vs(n-1)$ and Vsn is calculated to provide a value K21 which represents a decreasing rate of estimated vehicle speed. At Step 209, the value K21 is set to a value K2 which corresponds to a speed having $-1.2G$ (G is the acceleration of gravity) which is the lowest value of a vehicle deceleration DVv, in the case where the wheel speed Vw is increased with the wheel cylinder pressure decreased, and started decreasing again with the wheel cylinder pressure increased, so that the decreasing rate of estimated vehicle speed is low. The above-described Steps 205 to 209 are repeatedly executed for each of the road wheels FR, FL, RR, RL.

Then, the program proceeds to Step 210 where the minimum value of the values of K21 for the road wheels FR, RR, RL other than the road wheel FL is multiplied by 1.3 to provide a certain value K22. In Step 210, K21FR corresponds to the value of K21 for the road wheel FR, likewise K21RR for the road wheel RR and K21RL for the road wheel RL. Therefore, in the routine executed for the road wheel FR, for example, the values K21FR, K21RR and K21RL shown in Step 210 will be substituted by the values K21FL, K21RR and K21RL. MIN(A, B, C) in Step 210 represents a function to select the minimum value in the values A, B and C. Although the minimum value is multiplied by 1.3 to effectively prevent an excessive pressure decrease and a quick lock of the road wheels from occurring in this embodiment, each of the road wheels may be given weight varying in response to the relationship among the road wheels, the vehicle speed, the coefficient of friction of the road, and the like. After the value K22 has been obtained at Step 210, the program proceeds to Step 211 where the minimum value of the values K2 and K22 is set again to the value K22. The program proceeds further to Steps 212, 213, where a first set speed Vs(K1) and a second set speed Vs(K2) are obtained by adding a certain value K1 to the estimated vehicle speed Vs calculated at the preceding cycle of the routine, and subtracting the certain value K22 therefrom respectively. The certain value K1 corresponds to a speed having 4.0G (G is the acceleration of gravity) which is the highest value of a vehicle acceleration AVv.

Then, the program proceeds to Step 214 where the wheel speed Vw is compared with the first set speed Vs(K1). If it is determined that the wheel speed Vw is not less than the first set speed Vs(K1), the program proceeds to Step 216 where the estimated vehicle speed Vs is set to the first set speed Vs(K1). If the wheel speed Vw is less than the speed Vs(K1), the program proceeds to Step 215 where the wheel speed Vw is compared with the second set speed Vs(K2). If it is determined that the wheel speed Vw is greater than the second set speed Vs(K2), the program proceeds to Step 217 where the estimated vehicle speed Vs is set to the wheel speed Vw. If the wheel speed Vw is not greater than the second set speed Vs(K2), the program proceeds to Step 218 where the estimated vehicle speed Vs is set to the second set speed Vs(K2). The estimated vehicle speed is calculated for each of other road wheels FR, RR and RL in the same fashion as described above.

Thereafter, the program proceeds to Step 219 where it determines if the estimated vehicle speed Vs is greater than the minimum speed (4 km/h) for initiating the anti-skid control. If it is not greater than the minimum speed, the program proceeds to Step 220 where a slip rate Sp is set to zero and proceeds further to Step 222. If the estimated vehicle speed Vs is greater the minimum speed, the program proceeds to Step 221 where the slip rate Sp is calculated from the estimated vehicle speed Vs and the wheel speed Vw, and proceeds further to Step 222.

At Step 222, a wheel speed deviation $\Delta Vw$ is calculated as a difference between the estimated vehicle speed Vs and the wheel speed Vw. The program then proceeds to Step 223 where it determines if the motor 20 is in an off condition, or determines whether or not the anti-skid control has been initiated. If the motor 20 is in an on condition or the anti-skid control operation is being performed the program proceeds to Steps 227. If the motor 20 is in the off condition like in the initial condition, the program proceeds to Steps 224 and 225. Firstly, at Step 224, it is determined if the estimated vehicle speed Vs is greater than a predetermined speed of 10 km/h. If it is not greater than 10 km/h, the program proceeds to Step 233 in FIG. 5. If the estimated vehicle speed Vs exceeds 10 km/h, the program proceeds to Step 225 where it determines if the wheel speed Vw is less than the value of (K3·Vs−K4). If an affirmative decision is made, the program proceeds to Step 226 where the motor 20 is operated, whereas if a negative decision is made, the program proceeds to Step 233. The value of (K3·Vs−K4) used at Step 225 provides a threshold level for determining the initiation of anti-skid control, wherein K3 and K4 are certain values, and in the present embodiment for example, K3 is set to 0.95 and K4 is set to 2.0 km/h. The values K3, K4 may be set to various values depending on the various vehicle characteristics.

Figure 5:
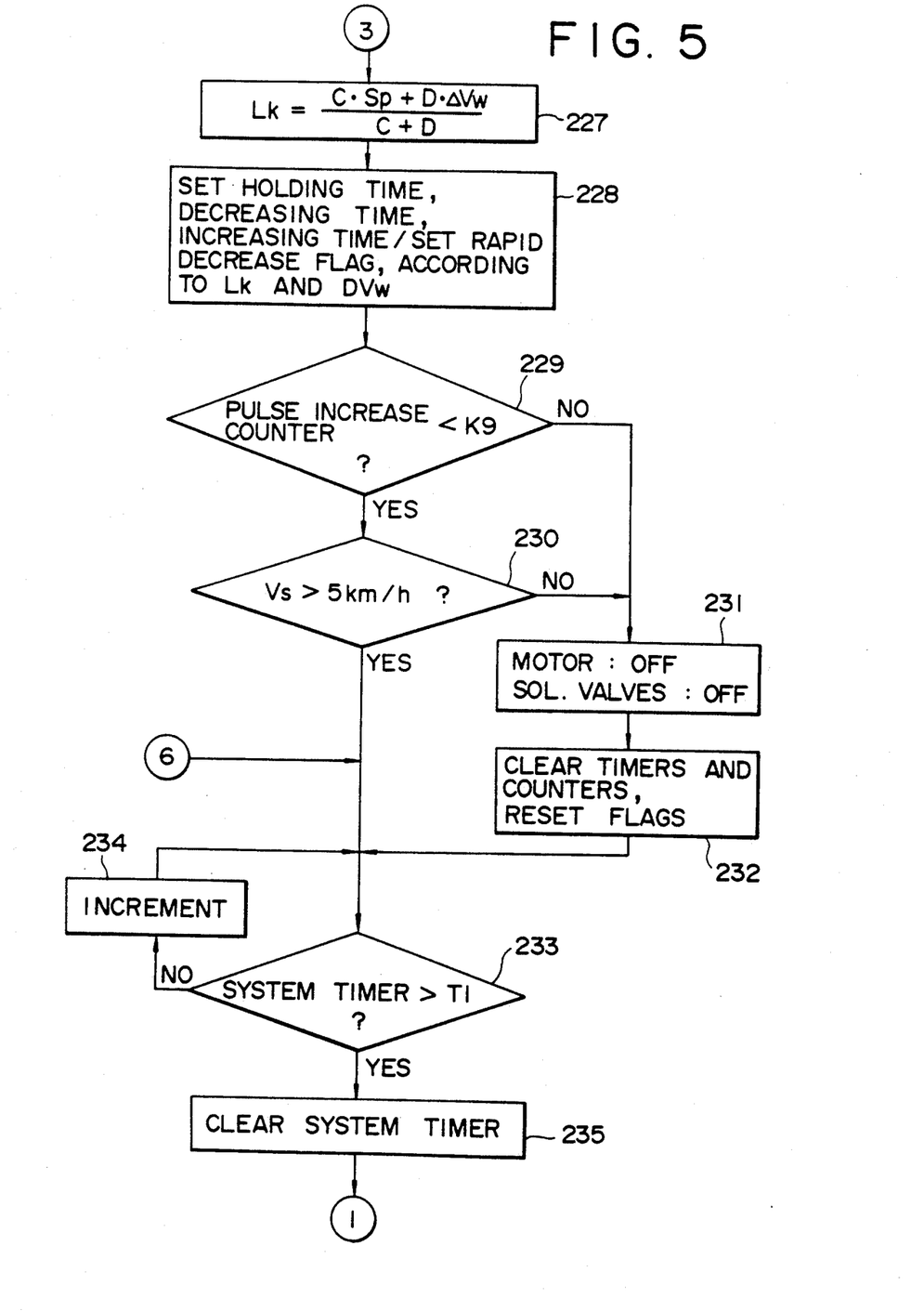
Figure 8:
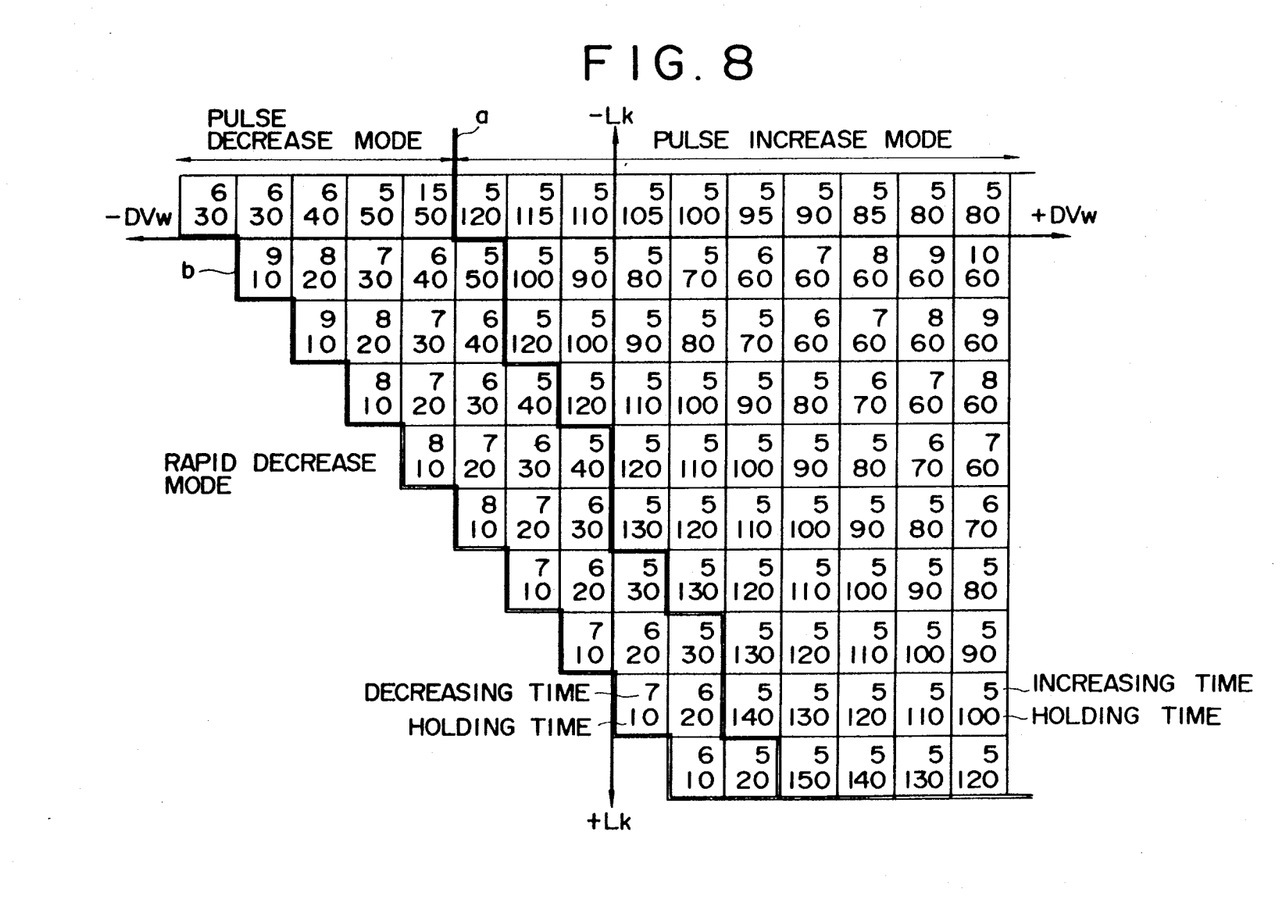
FIG. 8 is a diagram showing an increasing time and a holding time provided in a section, and a decreasing time and a holding time provided in a section in response to a wheel acceleration and a wheel lock rate according to the above embodiment.

Then, the program proceeds to Step 227 in FIG. 5 where a wheel lock rate Lk for indicating a locking condition of the road wheel is calculated in accordance with the following equation (1):

$$Lk = \frac{C \cdot Sp + D \cdot \Delta Vw}{C + D} \quad (1)$$

where C and D are certain values for giving weight to the slip rate Sp and the wheel speed deviation $\Delta Vw$. In general, the more the slip rate Sp is given weight, the more likely the wheel cylinder pressure is excessively decreased in the low speed area, while the more the wheel speed deviation $\Delta Vw$ is given weight, the more likely the wheel cylinder pressure is excessively decreased in the high speed area. At the next Step 228, the decreasing time and holding time of the wheel cylinder pressure are set to those times defined in the pulse decrease mode respectively in response to the values of the wheel lock rate Lk and wheel acceleration DVw, or the increasing time and holding time of the wheel cylinder pressure are set to those times defined in the pulse increase mode respectively in response to those values Lk and DVw, in accordance with a map or table as shown in FIG. 8. If the rapid decrease mode is selected in the table of FIG. 8, the rapid decrease flag is set (to "1").

In FIG. 8, the abscissa represents the wheel acceleration DVw, and the ordinate represents the wheel lock rate Lk which indicates a positive value in the downward direction from a point crossed by the abscissa and a negative value in the upward direction therefrom. The wheel acceleration DVw indicates zero G (G is the acceleration of gravity) at a point crossed by the ordinate, and indicates a positive value in the rightward direction therefrom and a negative value (i.e., deceleration) in the leftward direction therefrom. In accordance with the values of the wheel acceleration DVw and the wheel lock rate Lk, there is formed the table as shown in FIG. 8, which is stored in the memory of the microcomputer 11 and in which a central zone surrounded by double lines a and b is provided for the pulse decrease mode. A right zone defined on the right side of the double line a is provided for the pulse increase mode, while a left zone defined on the left side of the double line b is provided for the rapid decrease mode so that the holding time has been set to zero in the left zone. In the pulse increase mode, the increasing time (milliseconds) is provided at the upper row in each section of the table, while the holding time (milliseconds) is provided at the lower row in each section. In the pulse decrease mode, the decreasing time (ms) is provided at the upper row in each section of the table, while the holding time (ms) is provided at the lower row in each section.

The pulse decrease mode is a pressure control mode which alternately decreases and holds the wheel cylinder pressure repeatedly, so that the wheel cylinder pressure is reduced with the solenoid valves 31 to 38 operated in response to the decreasing time and the holding time set as described above. Accordingly, the decreasing speed of the wheel cylinder pressure is controlled in accordance with the proportion of the decreasing time and holding time. Similarly, in the pulse increase mode, the solenoid valves 31 to 38 are operated in response to the increasing time at the upper row in each section and the holding time at the lower row. The decreasing time, increasing time and holding time are counted by the aforementioned decrease timer, increase timer and hold timer respectively. Regarding to the proportion of the decreasing time and holding time in the pulse decrease mode, since the wheel acceleration DVw corresponds to the sufficient or insufficient amount of the wheel cylinder pressure, the proportion of the decreasing time and increasing time is provided such that the more the wheel acceleration is reduced, i.e., the wheel deceleration is increased, the more the wheel cylinder pressure is decreased, namely the decreasing time becomes longer while the holding time becomes shorter. In the case where the wheel lock rate Lk is large, it is determined that the vehicle is traveling on the road of rather low coefficient of friction, so that the proportion of the decreasing time and holding time is provided for decreasing the wheel cylinder pressure largely, since in case of rather low wheel cylinder pressure, the decreasing speed of the wheel cylinder pressure therefrom is low.

As to the pulse increase mode, however, in the case where the wheel acceleration DVw is large, the proportion of the increasing time and holding time is provided for increasing the wheel cylinder pressure largely even when the wheel lock rate Lk is large, so that the braking distance is prevented from being extended due to insufficiency of the wheel cylinder pressure. Further, in the case where the road wheel is likely to be locked after the wheel lock rate Lk has become small, the proportion of the increasing time and holding time is provided for increasing the wheel cylinder pressure gradually, so that the rapid decrease of the wheel speed Vw is prevented. Thus, a fine control of the wheel cylinder pressure can be performed in accordance with various characteristics in braking operation such as the response of the solenoid valves 31 to 38, the decreasing speed of the wheel cylinder pressure, the increasing speed thereof or the like, by properly providing the proportion of the decreasing time and holding time in the pulse decrease mode, and that of the increasing time and holding time in the pulse increase mode.

From Step 228, the program proceeds to Steps 229 and 230 where it determines if the anti-skid control is to be finished. Namely, if the pulse increase counter counts a predetermined number K9 or more, or if the estimated vehicle speed Vs is 5 km/h or less when the counter counts less than the number K9, the program proceeds to Step 2312 where the motor 20 is turned off and the solenoid valves 31 to 38 are turned off. Then, the program proceeds to Step 232 where the hold timer, decrease timer, increase timer and pulse increase counter are cleared, and where the pulse increase flag and rapid decrease flag are reset. Thereafter, at Steps 233 to 235, the operation period of 3 to 5 milliseconds in general is set. That is, if the system timer does not exceed a predetermined time T1, it is incremented at Step 234, and if the predetermined time T1 elapses, the system timer is cleared at Step 235 and the program returns to Step 202 in FIG. 3. If the pulse increase counter counts less than the number K9 and the estimated vehicle speed Vs is greater than 5 km/h, the program proceeds to Step 233.

Figure 6:
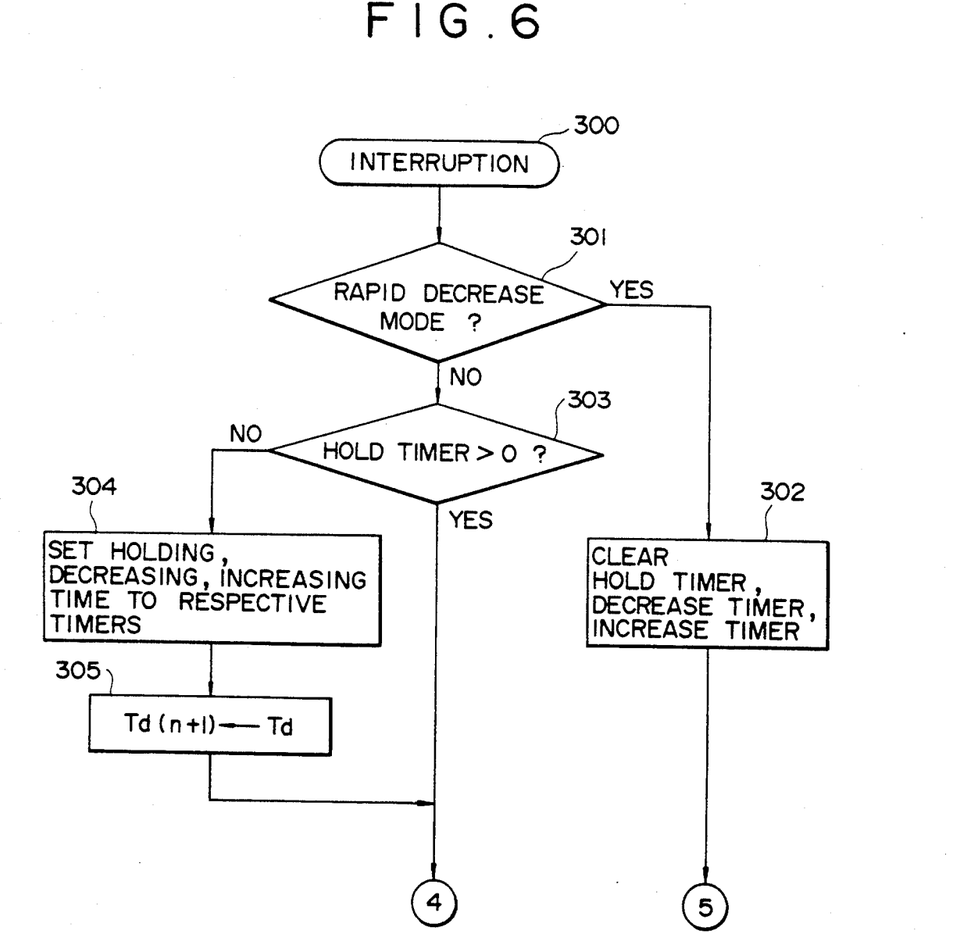
Figure 7:
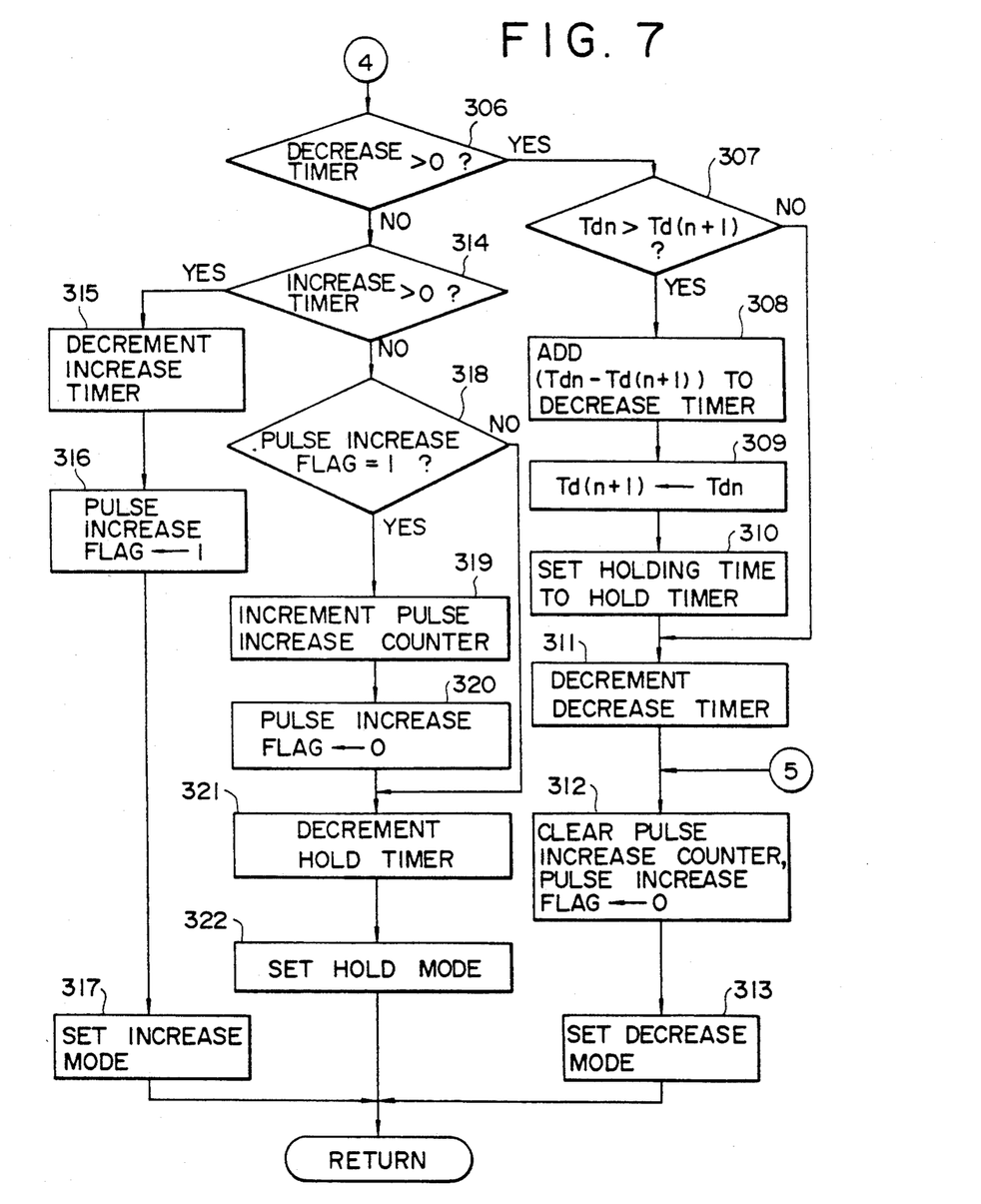

FIGS. 6 and 7 show a routine for interruption which interrupts the above-described routine every one millisecond to feed driving signals to solenoid valves 31 to 38. Firstly, at Step 301, the program determines if the rapid decrease mode is set, i.e., if the rapid decrease flag was set at Step 228. In case of the rapid decrease mode, the hold timer, decrease timer and increase timer are cleared to zero respectively at Step 302, and the program proceeds to Step 312. If the rapid decrease mode is not set, the program proceeds to Step 303 where it determines if the hold timer is set, i.e., if it exceeds zero. If the hold timer is zero, the program proceeds to Step 304 where the holding time, decreasing time and increasing time defined at Step 228 are to set to the hold timer, decrease timer and increase timer respectively. thereafter, at Step 305, the decreasing time Td at present cycle is set to the decreasing time Td(n+1) for the next cycle.

Next, the program proceeds to Step 306 as shown in FIG. 7 where it determines if the decrease timer is set. If it is set, the program proceeds to Step 307 to 313 where the decrease mode is set. At Steps 307 and 308, when the decreasing time has been extended due to out of control from the table of FIG. 8 during the decrease mode signal outputs in the pulse decrease mode, the decreasing time is reset to a new decreasing time. Namely, if the present decreasing time Tdn comes to be longer than the next decreasing time Td(n+1) set at Step 305, the difference therebetween (Tdn−Td(n+1)) is added to the present time of the decrease timer, then the next decreasing time Td(n+1) is reset to the present decreasing time Tdn at Step 309, and the program proceeds to Step 310 where the hold timer is set to the holding time at that time according to the table of FIG. 8. Thereafter, the decrease timer is decremented by one (−1) at Step 311, then the pulse increase counter is cleared, and the pulse increase flag is reset to zero respectively at Step 312. Accordingly, the decrease mode signal outputs at Step 313, so that the solenoid valves 31 (33, 35, 37) located on the hydraulic pressure supplying side are turned on to block the supply of hydraulic pressure, and the solenoid valves 32 (34, 36, 38) located on the drain side are turned on to drain the hydraulic pressure to the reservoirs 23 (24).

Returning to Step 306, if the decrease timer is not set, the program proceeds to Step 314 where it determines if the increase timer is set. If the increase timer is set, the program proceeds to Step 315 where the increase timer is decremented by one (−1), and further proceeds to Step 316 where the pulse increase flag is set (to "1"). Then, at Step 317, the increase mode is set, so that all the solenoid valves 31 to 38 are turned off to be in the condition as shown in FIG. 1, i.e., their hydraulic pressure supplying sides are open and their drain sides are closed.

In the case where it is determined at Step 314 that the increase timer is not set so that it indicates zero, the program proceeds to Step 318 where it determines if the pulse increase flag is set. If yes, the program proceeds to Step where the pulse increase counter is incremented by one (+1), and further proceeds to Step 320 where the pulse increase flag is reset to zero. Then, the hold timer is decremented by one (−1) at Step 321, and the hold mode is set at Step 322. If it is determined at Step 318 that the pulse increase flag is not set, the program proceeds to Step 322 without executing Steps 319, 320. At Step 322 the solenoid valves 31, 33, 35, 37 are turned on and the solenoid valves 32, 34, 36, 38 are turned off, so that the wheel cylinder pressure in each of the wheel brake cylinders 51 to 54 is held as it is.

According to the present embodiment, therefore, the decreasing time, increasing time and holding time are adequately set in accordance with the relationship between the wheel acceleration DVw and the wheel lock rate Lk, so that the most appropriate proportion of those times may be set in view of the increasing or decreasing characteristic of the wheel cylinder pressure controlled by the pressure control means such as the solenoid valves 31 to 38. For example, when both the wheel acceleration DVw and the wheel lock rate Lk are close to zero, the proportion of the decreasing time and holding time may be set to provide the decrease mode in which the amount of decreasing pressure is reduced. If the decreasing time is controlled to be increased gradually in response to increase of the wheel lock rate Lk and the wheel deceleration, i.e., the decrease of the wheel acceleration DVw, any influence affected by dispersion of responses of the pressure control means such as the solenoid valves 31 to 38 will be made small. In the case where the wheel acceleration DVw is relatively small, i.e., the wheel speed Vw starts increasing, the increasing time will be reduced to prevent the road wheel from being locked.

According to the present embodiment, at Steps 204 to 211 as shown in FIG. 3, the estimated vehicle speed is calculated for each of the road wheels on the basis of the minimum decreasing rate of estimated vehicle speed in the decreasing rates of estimated vehicle speed for the road wheels FR, RR, RL other than the road wheel FL for which the estimated vehicle speed is being calculated. Namely, the decreasing rate of the estimated vehicle speed for each of the road wheels is limited in response to the minimum decreasing rate of estimated vehicle speed for other road wheels. Consequently, the present embodiment can prevent the excessive decrease of the wheel cylinder pressure from being caused by the difference in wheel speed between the road wheel located on the inside of the curve in the vehicle's path and the road wheel located on the outside of the curve in turning of the vehicle, or the difference in wheel speed between the road wheels of different sizes mounted on the vehicle. Also, it can prevent the quick lock which occurs when the estimated vehicle speed is set largely below the actual vehicle speed.

It should be apparent to one skilled in the art that the above-described embodiments are merely illustrative of but a few of the many possible specific embodiments of the present invention. Numerous and various other arrangements can be readily devised by those skilled in the art without departing from the spirit and scope of the invention as defined in the following claims.

What is claimed is:

1. An anti-skid control system for an automotive vehicle having a wheel brake cylinder mounted on each of a plurality of road wheels for applying a braking force thereto and a master cylinder for supplying a hydraulic braking pressure to said wheel brake cylinder, comprising:

means for detecting wheel speed of each of said road wheels and providing an output signal corresponding to said wheel speed;

means for calculating an estimated vehicle speed for each of said plurality of road wheels on the basis of said wheel speed of each of said plurality of road wheels;

means for calculating a decreasing rate of said estimated vehicle speed of each of said plurality of road wheels;

means for modifying said estimated vehicle speed to provide a standard estimated vehicle speed for each of said plurality of road wheels in response to the decreasing rate of said estimated vehicle speed of at least one of said plurality of road wheels other than said estimated vehicle speed to be modified;

means for comparing said standard estimated vehicle speed and said wheel speed for each of said plurality of road wheels; and pressure control means for increasing, holding or decreasing said hydraulic braking pressure in response to a comparison between said standard estimated vehicle speed and said wheel speed for each of said plurality of road wheels.

2. An anti-skid control system for an automotive vehicle as set forth in claim 1, wherein said means for modifying said estimated vehicle speed modifies said estimated vehicle speed to provide said standard estimated vehicle speed for each of said plurality of road wheels on the basis of a minimum decreasing rate of the decreasing rates of said estimated vehicle speeds of said plurality of road wheels other than said estimated vehicle speed to be modified.

3. An anti-skid control system for an automotive vehicle as set forth in claim 1, wherein said means for modifying said estimated vehicle speed limits the decreasing rate of said estimated vehicle speed to provide said standard estimated vehicle speed for each of said plurality of road wheels in response to the decreasing rate of said estimated vehicle speed of at least one of said plurality of road wheels other than said estimated vehicle speed to be modified.

4. An anti-skid control system for an automotive vehicle having a wheel brake cylinder mounted on each of road wheels for applying a braking force thereto and a master cylinder for supplying a hydraulic braking pressure to said wheel brake cylinder, comprising:

means for detecting a wheel speed of each of said road wheels and providing an output signal corresponding to said wheel speed;

means for calculating wheel acceleration of each of said road wheels from said wheel speed;

means for calculating an estimated vehicle speed for each of said road wheels on the basis of said wheel speed of each of said road wheels;

means for calculating a decreasing rate of said estimated vehicle speed of each of said road wheels;

means for modifying said estimated vehicle speed to provide a standard estimated vehicle speed for each of said road wheels in response to the decreasing rate of said estimated vehicle speed of at least one of said road wheels other than said estimated vehicle speed to be modified;

means for calculating a difference between said wheel speed and said standard estimated vehicle speed;

means for setting a wheel lock rate indicative of a locking condition of each of said road wheels on the basis of at least said difference between said wheel speed and said standard estimated vehicle speed;

means for setting an increasing time for increasing said hydraulic braking pressure supplied to said wheel brake cylinder and a holding time for holding said hydraulic braking pressure with a proportion between said increasing time and said holding time determined in response to a relationship between said wheel acceleration and said wheel lock rate, and setting a decreasing time for decreasing said hydraulic braking pressure and said holding time with a proportion between said decreasing time and said holding time determined in response to a relationship between said wheel acceleration and said wheel lock rate; and pressure control means for alternately increasing and holding said hydraulic braking pressure supplied to said wheel brake cylinder in response to said increasing time and said holding time, or alternately decreasing and holding said hydraulic braking pressure in response to said decreasing time and said holding time.

5. An anti-skid control system for an automotive vehicle as set forth in claim 4, wherein said means for modifying said estimated vehicle speed modifies said estimated vehicle speed to provide said standard estimated vehicle speed for each of said road wheels on the basis of a minimum decreasing rate of the decreasing rates of said estimated vehicle speeds of said road wheels other than said estimated vehicle speed to be modified.

6. An anti-skid control system for an automotive vehicle as set forth in claim 4, wherein said means for modifying said estimated vehicle speed limits the decreasing rate of said estimated vehicle speed to provide said standard estimated vehicle speed for each of said road wheels in response to the decreasing rate of said estimated vehicle speed of at least one of said road wheels other than said estimated vehicle speed to be modified.

* * * * *